(12) United States Patent
Sommerer et al.

(10) Patent No.: US 11,251,598 B2
(45) Date of Patent: Feb. 15, 2022

(54) GAS DISCHARGE TUBE DC CIRCUIT BREAKER

(71) Applicant: General Electric Company, Schenectady, NY (US)

(72) Inventors: Timothy John Sommerer, Ballston Spa, NY (US); Joseph Darryl Michael, Delmar, NY (US); David John Smith, Clifton Park, NY (US)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/740,058

(22) Filed: Jan. 10, 2020

(65) Prior Publication Data

US 2021/0218240 A1    Jul. 15, 2021

(51) Int. Cl.
| | |
|---|---|
| *H02H 3/00* | (2006.01) |
| *H02H 3/087* | (2006.01) |
| *H01C 7/12* | (2006.01) |
| *H01H 71/02* | (2006.01) |
| *H01H 71/08* | (2006.01) |
| *H02H 1/00* | (2006.01) |

(52) U.S. Cl.
CPC ............ *H02H 3/087* (2013.01); *H01C 7/12* (2013.01); *H01H 71/02* (2013.01); *H01H 71/08* (2013.01); *H02H 1/0007* (2013.01)

(58) Field of Classification Search
None
See application file for complete search history.

(56) References Cited

U.S. PATENT DOCUMENTS

| | | | |
|---|---|---|---|
| 4,396,865 A | 8/1983 | Britt et al. | |
| 5,132,597 A | 7/1992 | Goebel et al. | |
| 5,608,297 A | 3/1997 | Goebel | |
| 6,049,174 A * | 4/2000 | Pirrie | H01J 17/30 |
| | | | 313/592 |
| 8,837,093 B2 | 9/2014 | Panousis et al. | |
| 9,742,185 B2 * | 8/2017 | Wang | H02H 3/087 |
| 2016/0322809 A1 | 11/2016 | Wang et al. | |

FOREIGN PATENT DOCUMENTS

| | | |
|---|---|---|
| CN | 203180512 U | 9/2013 |
| CN | 208904647 U | 5/2019 |
| EP | 3522194 A1 | 8/2019 |

(Continued)

OTHER PUBLICATIONS

Dullni et al., "Investigation of High-Current Interruption of Vacuum Circuit Breakers", IEEE Transactions on Electrical Insulation, vol. 28, Issue No. 04, pp. 607-620, Aug. 1993.

(Continued)

*Primary Examiner* — Stephen W Jackson
(74) *Attorney, Agent, or Firm* — Eversheds Sutherland (US) LLP

(57) ABSTRACT

A DC circuit breaker includes a gas discharge tube (GDT) coupled in parallel with an extinguishing path. The GDT conducts and interrupts a load current through a normal current path. The GDT includes a thermionic cathode, an anode, and a control grid. The control grid is configured to regulate opening and closing of the normal current path. The extinguishing path is configured to lengthen a break time for the DC circuit breaker.

21 Claims, 2 Drawing Sheets

(56) References Cited

FOREIGN PATENT DOCUMENTS

| GB | 2077529 A | 12/1981 |
|---|---|---|
| GB | 2297863 A | 8/1996 |
| WO | 2014142974 A1 | 9/2014 |
| WO | 2017137057 A1 | 8/2017 |
| WO | 2020190290 A1 | 9/2020 |

OTHER PUBLICATIONS

Goebel et al., "Low Voltage Drop Plasma Switch for Inverter and Modulator Applications", Review of Scientific Instruments, vol. 64, Issue No. 08, pp. 2312-2319, 1993.
Uchii et al., "Behaviour of Inhomogeneous High-Temperature SF/Sub 6/ Gas in a Gas Circuit Breaker", 2001 IEEE Power Engineering Society Winter Meeting, vol. 01, pp. 289-294, Columbus, OH, USA, Aug. 7, 2002.
International Search Report & Written Opinion dated Apr. 21, 2021 for International Applicatin No. PCT/US2021/012728.
Pirrie C A et al: 11 the evolution of the hydrogen thyratron, Conference Record of the 2000 Twenty-fourth International Power Modulator Symposium, Norfolk, VA; [International Power Modulator Symposium], IEEE, Piscataway, NJ, Jun. 26, 2000 (Jun. 26, 2000), pp. 9-16, XP032142304, DOI:10.1109/MODSYM.2000. 896153 ISBN: 978-0-7803-5826-3, pp. 9-15.

\* cited by examiner

GAS DISCHARGE TUBE DC CIRCUIT BREAKER

BACKGROUND

The field of the disclosure relates generally to direct current (DC) circuit breakers and, more particularly, to a gas discharge tube DC circuit breaker and method of use.

Many known transmission and distribution systems include mechanical isolation devices, e.g., circuit breakers, to interrupt current flowing between two points of the system. In alternating current (AC) systems, the zero-crossings of the current naturally ease the interruption. Due to the nature of direct current (DC), i.e., no zero-crossing of the amplitudes of DC voltages and currents as a function of time, interrupting current in a DC distribution system is more difficult, has a greater risk of arcing, and reduces the effectiveness and service life of circuit breakers.

At least some known DC circuit breakers include a normal current path and a commutation path through which load current is diverted momentarily to enable a primary switch on the normal current path to open. Once the primary switch is open, the commutation path is opened, thereby interrupting the load current. DC circuit breakers with parallel normal current and commutation paths, particularly in medium- (above 1 kilovolt) and high-voltage (e.g., above 100 kilovolt) electrical systems utilizing electromechanical contactors, are physically large and slow. At least some implementations, such as medium- or high-voltage DC systems and mobile applications, cannot accommodate these large devices. Moreover, response times in excess of 1 millisecond are slower than desired. Accordingly, it is generally desirable to reduce the size and response time, and increase the power density of DC circuit breakers.

BRIEF DESCRIPTION

In one aspect, a DC circuit breaker includes a gas discharge tube coupled in parallel with an extinguishing path. The gas discharge tube conducts and interrupts a load current through a normal current path. The gas discharge tube includes a thermionic cathode, an anode, and a control grid. The control grid is configured to regulate opening and closing of the normal current path. The extinguishing path is configured to lengthen a break time for the DC circuit breaker.

In another aspect, a method of interrupting a DC in an electrical system using a DC circuit breaker. The method includes receiving a triggering logic signal and, in response, opening a gas discharge tube through which the DC is conducting. The method includes directing the DC through an extinguishing path coupled in parallel with the gas discharge tube. The method includes dissipating energy inductively stored in the electrical system into the extinguishing path over a controlled period of time.

In yet another aspect, a gas discharge tube is provided. The gas discharge tube includes a housing defining an interior portion, a thermionic cathode, an anode, a gas disposed in the interior portion, and a control grid. The thermionic cathode is composed of lanthanum hexaboride (LaB6), is disposed within the interior portion, and has a low forward voltage. The anode is disposed within the interior portion and is spaced apart from the thermionic cathode. The gas is configured to insulate the thermionic cathode from the anode. The control grid is disposed between the thermionic cathode and the anode within the interior portion. The control grid is configured to generate an electric field to establish a conductive plasma between the thermionic cathode and the anode to close a normal current path extending from the thermionic cathode to the anode.

DRAWINGS

These and other features, aspects, and advantages of the present disclosure will become better understood when the following detailed description is read with reference to the accompanying drawings in which like characters represent like parts throughout the drawings, wherein.

Figure 1:
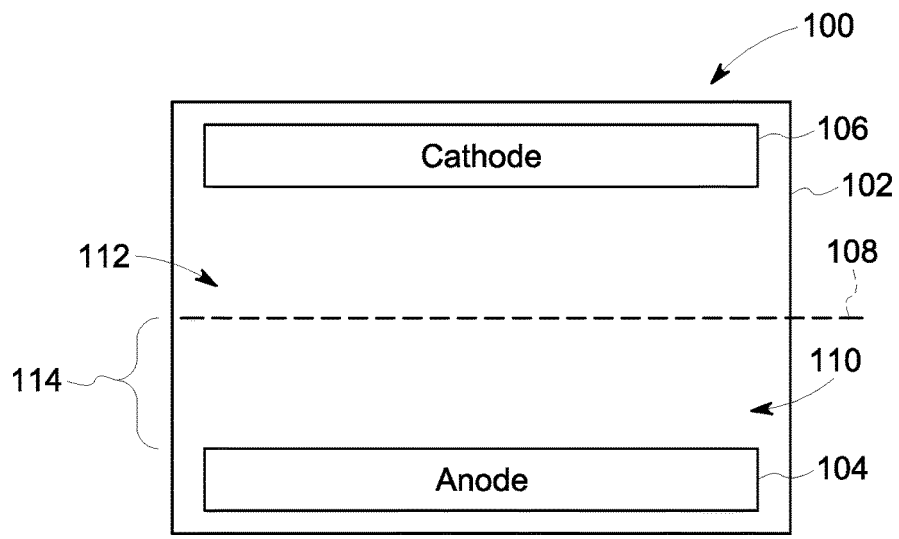
FIG. 1 is a block diagram of an exemplary gas discharge tube.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it relates. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein. Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the present disclosure relate to DC circuit breakers. Such DC circuit breakers may be implemented in electrical systems operating, for example, at medium- or high-voltage, or above about 1 kilovolt. The DC circuit breakers described herein provide current interruption via an in-line gas discharge tube including a thermionic cathode having a low forward voltage, or a forward voltage drop that is a small fraction of the maximum rated voltage for the device. For example, certain low forward voltage power thyristors are rated for 8.5 kV with a forward voltage drop of about 2.5 V, or about 0.0003 of the maximum voltage. In another example, certain gas tubes with cold cathodes have a maximum voltage of about 100 kV with a forward voltage drop in the range of 150-500 V, or about 0.0015 to 0.005 of the maximum voltage. Embodiments of the thermionic cathodes described herein for 100 kV gas discharge tubes have a forward voltage drop below 50 V. Certain embodiments have a forward voltage drop below 30 V for certain gases, e.g., hydrogen or deuterium, and about 5 V for certain other gases, e.g., xenon. Accordingly, during normal operation, the gas discharge tube conducts with low losses, or low parasitic losses.

Conversely, a conventional stack of power semiconductors able to open against current flow, such as insulated-gate bipolar transistors (IGBTs), which generally operate below 10 kV, in the normal current path of the DC circuit breaker experiences high losses when scaled to high voltages, e.g., 100 kV. Typically, a mechanical switch is included in the normal current path along with one or more IGBTs to divert, or commutate, the current through a commutation path momentarily when the mechanical switch is to be opened, e.g., during a fault condition. The mechanical switch and IGBTs introduce lower losses than a 100 kV stack of IGBTs in the normal current path. Instead the 100 kV stack of IGBTs is in a parallel commutation path that only conducts the current briefly during an interruption (e.g., for about 1 millisecond) to enable the mechanical switch to open under zero loading to prevent arcing. Consequently, the losses exhibited in the commutation path are acceptably low.

The DC circuit breakers described herein provide current interruption without a parallel commutation path through which current is diverted for the purpose of opening, or interrupting, the DC. The DC circuit breakers described herein include a parallel extinguishing path, e.g., a surge arrestor including, for example, and without limitation, a variable impedance, to dissipate energy stored in the natural inductance of the electrical system. The surge arrestor, in certain embodiments, is sized to lengthen the fault-current suppression time of the DC circuit breaker, or the time necessary to reduce the peak fault current through the breaker to zero. For example, the surge arrestor may include a metal-oxide varistor that lengthens the fault current suppression time, and therefore the break time, and effectively reduces the dI/dt, the transient interruption voltage (TIV), and the peak TIV for the interruption.

FIG. 1 is a diagram of an exemplary gas discharge tube 100. Gas discharge tube 100 includes a housing 102, an anode 104, a cathode 106, and a control grid 108. Anode 104, cathode 106, and control grid 108 are disposed within an interior portion 110 of housing 102. Although the exemplary embodiment includes a single control grid 108, other embodiments may include more than one control grid 108. Anode 104 is a solid metal anode in the exemplary embodiment.

Cathode 106 is a thermionic cathode having a low forward voltage to reduce losses during normal operation, i.e., normal current conduction through gas discharge tube 100. Cathode 106 may, in certain embodiments, be composed of lanthanum hexaboride (LaB6), barium (Ba), or any other thermionic emitter material with a low work-function, such as a metal oxide, metal-carbide, or metal-boride. LaB6, for example, has a work-function of about 2.3-2.7 eV, depending on surface conditions. Likewise, Ba has a work-function of about 2 eV, depending on its precise chemistry. Because LaB6 has a slightly higher work-function than Ba, its operating temperature is higher (1500 degrees C. versus 1150 degrees C.), which would conventionally indicate a LaB6 cathode would exhibit higher losses than a Ba cathode. However, in embodiments described herein, with appropriate thermal insulation (e.g., radiation shields), the high operating temperature of either, for example, a LaB6 or Ba cathode can be maintained without additional parasitic losses that would result in a higher forward voltage drop, and without the need for additional heating power to bring cathode 106 to its operating temperature. Accordingly, cathode 106 can conduct high total current over a long operating life with low forward operating losses.

Generally, current is conducted from anode 104 to cathode 106 over an ionized plasma contained within interior portion 110. Interior portion 110 is filled with a gas 112 at a pressure of about 0.01-100 pascal in the exemplary embodiment. In the exemplary embodiment, gas 112 is hydrogen, and in certain embodiments, gas 112 is the hydrogen isotope deuterium. Hydrogen is generally understood to be more difficult to ionize and generally leads to a higher forward voltage drop than deuterium on a thermionic cathode, such as cathode 106. Hydrogen and deuterium are conventionally used in thyratron tubes. Alternatively, gas 112 may be any other suitable gas or gases, such as a noble gas or noble gas mixture that enables operation of gas discharge tube 100 as described herein. For example, gas 112 may include the noble gas xenon. Xenon is a chemically inert rare gas, has the lowest ionization energy of the known stable rare gases and has a relatively large cross-section for electron impact ionization, enabling it to have a low forward voltage. Practical reservoirs for maintaining a gas pressure of hydrogen or deuterium within gas discharge tube 100 over its life can be formed with a metal sponge that forms a hydride and can be heated or cooled to release or reabsorb hydrogen or deuterium in a controllable manner. Reservoirs for other gases may likewise be made.

Generally, a solid metal cathode emits electrons by secondary emission, field emission, or by thermionic emission. Secondary emission is a response to incident particles that carry some amount of electron-volts of kinetic energy and/or latent energy (e.g., energy above the thermal energy of 0.025 eV at room temperature) such as ions, electronically-excited atoms, or photons. Field emission is a response to a strong electric field at the surface that pulls electrons out of their trapping potential well (generally requiring, for example, about 1 GV/m of electric field, which is difficult to generate in practice). Thermionic emission occurs when the cathode metal is heated until electrons "boil off" over their trapping potential well. The potential well is defined by a work-function of the material, which varies from 1-5 eV for most materials. Generally, electron emission can occur by all three mechanisms at the same time and, in some cases, the mechanisms cooperate. For example, thermionic emission and field emission can cooperate to produce field-enhanced thermionic emission. However, at a given condition one emission mechanism typically dominates the others.

In embodiments of gas discharge tube 100 described herein, electrons are emitted from cathode 106 primarily by thermionic emission, although, notably, a relatively small number of electrons are emitted by secondary emission and field emission. Accordingly, electron emission is generally described herein in terms of thermionic emission.

Emitted electrons pass through gas 112 within interior portion 110, colliding with gas atoms or molecules along the way to create electron-ion pairs, and are collected at anode 104. Accordingly, conventional current flows from anode 104 to cathode 106, opposite the electron flow. Notably, current flow can be blocked by gas discharge tube 100 in both directions, while current is conducted only from anode 104 to cathode 106. In embodiments of circuit breakers where bidirectional current conduction is necessary, a single bidirectional gas discharge tube or two gas discharge tubes arranged in antiparallel are conventionally necessary.

Control grid 108 is one or more electrodes used to selectively control gas discharge tube 100 through application, removal, and/or variation of an electric field. In certain embodiments, control grid 108 is a thin shell (e.g., about 0.5 mm thick) with apertures that allow plasma current to pass through. The apertures may be circular holes arranged in an array, each with some diameter that enables control grid 108 to stop a given current density of plasma current flow when desired. For example, the diameter, in certain embodiments, may range from about 0.5 mm to about 2 mm. In one example embodiment, the diameter is about 1 mm. Likewise, the spacing between the apertures may be as close as possible to maximize area for plasma current passage without sacrificing the mechanical integrity of control grid 108. For example, in certain embodiments, the aperture spacing from edge-to-edge is about 15 micrometers. In alternative embodiments, the aperture diameter and spacing may be more or less for a given application of control grid 108 and gas discharge tube 100.

In operation, to close the circuit, a voltage is applied to control grid 108, or control grid 108 is energized, to create an electric field that draws electrons from cathode 106 into a high-voltage gap 114 between control grid 108 and anode 104, and enables ionization of gas 112 within interior portion 110. When gas discharge tube 100 is closed (e.g., turned on, conducting, etc.), gas 112 within housing 102 becomes ionized (i.e., some portion of the gas is dissociated into free electrons and ions), resulting in an electrically conductive plasma. Where gas 112 is a molecular gas, such as hydrogen or deuterium, then the plasma may also contain molecular ions and neutral fragments of the molecules. Electrical continuity is maintained between cathode 106 and gas 112 through thermionic electron emission from cathode 106. With proper thermal insulation, cathode 106 can be heated to its operating temperature by the release of latent heat when incident ions recombine at the surface of cathode 106, as well as the kinetic energy of the incident ions.

Accordingly, control grid 108 does not need to be continuously energized to maintain the plasma for normal forward conduction operation. When gas discharge tube 100 is to be opened, (e.g., turned off, or to interrupt current conduction), control grid 108 is energized to interrupt current for a sufficient duration to deionize gas 112 in high-voltage gap 114 between control grid 108 and anode 104. High-voltage gap 114 and the pressure of gas 112 are designed to avoid both vacuum and gas breakdown to produce a desired standoff potential.

In the exemplary embodiment, the material of cathode 106 does not evaporate to an extent that it substantially changes the properties of gas 112, either in its insulating state, or in its conducting state. Alternatively, there is some interaction between gas 112 and evaporated material from cathode 106. When gas discharge tube 100 is opened (e.g., turned off, not conducting, etc.), gas 112 insulates anode 104 from cathode 106.

In certain embodiments, cathode 106 includes a heating element (not shown), such as a resistive heater, that heats cathode 106 to near its operating temperature before gas discharge tube 100 is closed and cathode 106 conducts normal current. Once normal current is flowing over the conductive plasma, cathode 106 is heated by incident ions, generally rendering it unnecessary to heat cathode 106 with the separate heating element. When gas discharge tube 100 is opened, cathode 106 cools and ceases emission of electrons that could re-close gas discharge tube 100. The heating element should be re-engaged to heat cathode 106 before re-closing gas discharge tube 100. Accordingly, disengaging the heating element during normal current conduction reduces parasitic losses and reduces the likelihood of an unplanned re-closure of gas discharge tube 100, for example, due to thermal arcing that results from control grid 108 being held at a floating potential instead of a negative potential relative to cathode 106.

Figure 2:
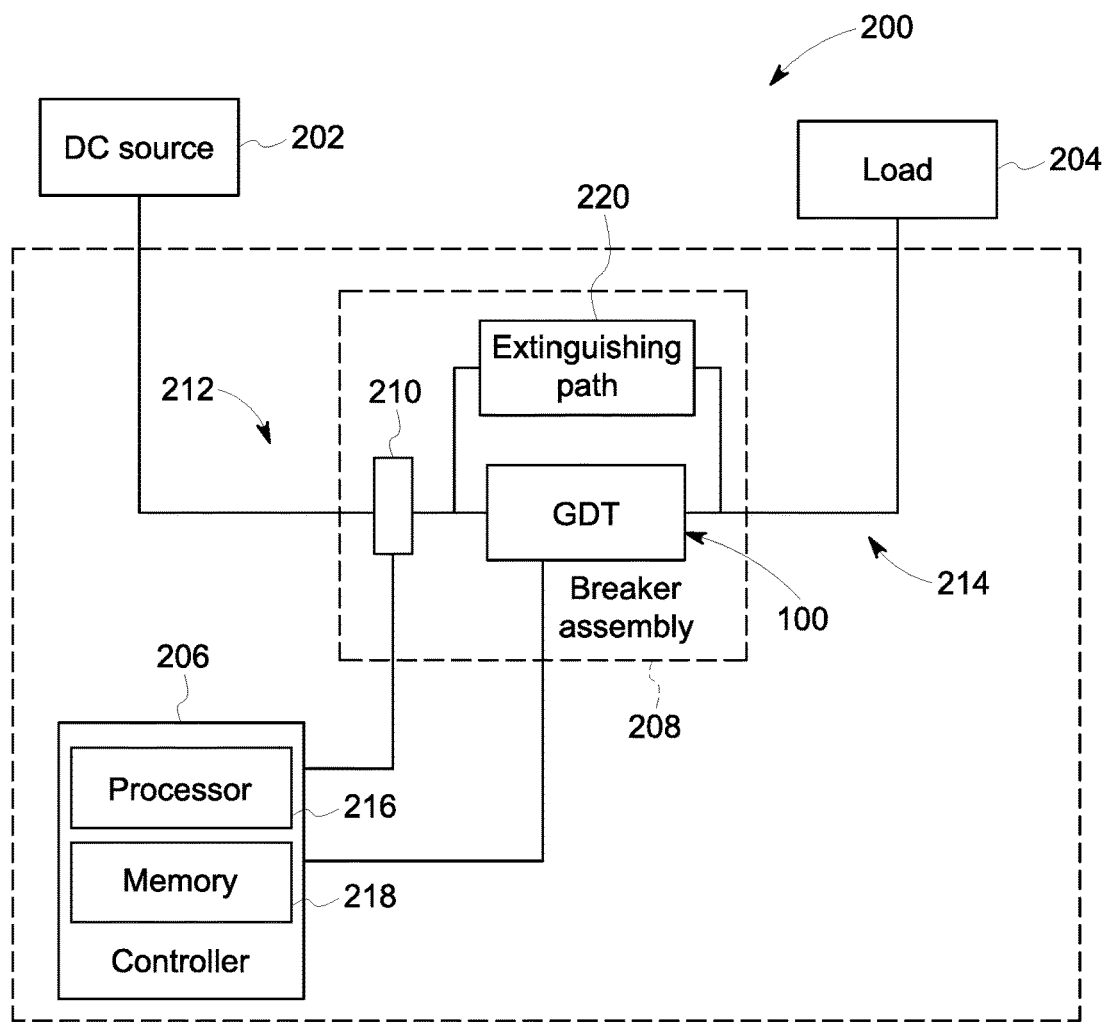
FIG. 2 is a block diagram of an exemplary DC circuit breaker including the gas discharge tube shown in FIG. 1.

FIG. 2 is a block diagram of an exemplary direct current (DC) circuit breaker 200 including gas discharge tube 100 (shown in FIG. 1). DC circuit breaker 200 is coupled between a DC source 202 and a load 204. Electrical current flows from DC source 202 to load 204 through DC circuit breaker 200. DC circuit breaker 200 includes a controller 206 and a breaker assembly 208. Breaker assembly 208 receives DC current and conducts the current through gas discharge tube 100, i.e., the normal current path, to load 204. Controller 206 is configured to selectively operate breaker assembly 208 to interrupt DC current conducted through breaker assembly 208. The time between a trip order and a reduction of total current through DC circuit breaker 200 to zero is referred to as the break time. When gas discharge tube 100 is open, DC current cannot flow through breaker assembly 208. Conversely, when gas discharge tube 100 is closed, DC current can flow through the normal current path of breaker assembly 208. Because gas discharge tube 100 includes cathode 106, which is a thermionic cathode with a low forward voltage, the DC current is conducted through breaker assembly 208 and, more specifically, gas discharge tube 100, from DC source 202 to load 204 with low losses. Although a single gas discharge tube 100 is illustrated in FIG. 2, breaker assembly 208 may include more than one gas discharge tube 100 coupled together in series and/or in parallel to increase the standoff voltage capacity and/or current capacity of breaker assembly 208.

DC circuit breaker 200 includes a sensor 210 coupled to a line side 212 of breaker assembly 208, e.g., between DC source 202 and gas discharge tube 100, and opposite a load side 214 of breaker assembly 208. Sensor 210 is a current sensor, such as a current transformer, a Rogowski coil, a Hall-effect sensor, and/or a shunt that measures a current flowing through breaker assembly 208. Alternatively, sensor 210 may include any other sensor that enables DC circuit breaker 200 to function as described herein. Sensor 210 generates a signal representative of the measured or detected current (hereinafter referred to as "current signal") flowing through breaker assembly 208. In addition, sensor 210 transmits the current signal to controller 206. Controller 206 is configured to control breaker assembly 208 and, more particularly, gas discharge tube 100, to interrupt a DC current provided to load 204 upon detection of a fault condition. For example, if controller 206 determines the current signal, and/or the current represented by the current signal, exceeds a protection threshold, a fault condition is determined to exist and controller 206 opens gas discharge tube 100 to interrupt the DC current. The time period between the current measurement and the instruction by controller 206 to open gas discharge tube 100 is referred to as a detection time, i.e., the time from fault inception to a trip order. In other embodiments, DC circuit breaker 200 includes more than one sensor 210. Moreover, in some embodiments, controller 206 is additionally or alternatively configured to interrupt a DC current provided to load 204 in response to a signal other than the current signal, e.g., a control signal from another controller, a different sensor signal, etc.

Controller 206 includes a processor 216 and a memory 218 coupled to processor 216. Based at least in part on the current signal, processor 216 determines when the DC current through breaker assembly 208 exceeds a protection threshold and controls breaker assembly 208 to interrupt the DC current upon determining that the current exceeds the protection threshold. Memory 218 stores program code and instructions, executable by processor 216, to control breaker assembly 208.

Gas discharge tube 100 can open quickly in response to a triggering logic signal from controller 206, reducing current to zero on the order of 1 microsecond from receipt of the triggering logic signal, e.g., as a result of a fault detection.

The fast response of gas discharge tube 100 enables it to open "provisionally," e.g., after as few as one or two samples of current sensor 210, and then re-close quickly if it is determined the system can continue normal operation, i.e., without an interruption by DC circuit breaker 200. For example, where conventional circuit breakers may evaluate numerous samples to confirm a fault condition before logically initiating an interruption, gas discharge tube 100 can initiate opening after one or two samples and then re-close if subsequent samples indicate the previous samples were a false-positive, i.e., not a true fault condition. In such a scenario, the electrical system in which DC circuit breaker 200 is implemented would not recognize that gas discharge tube 100 had opened.

Such fast opening can create large transient voltages induced by the natural inductance (i.e., the di/dt) of the system, or the load. The maximum such voltage is referred to as a peak transient interruption voltage (TIV), which occurs some time after controller 206 issues its instruction to open gas discharge tube 100, referred to as the internal current commutation time. To reduce voltage stress imparted on breaker assembly 208 and either of DC source 202 or load 204 by the TIV, DC circuit breaker 200 includes a extinguishing path 220 coupled in parallel with gas discharge tube 100, e.g., from line side 212 to load side 214, to dissipate electrical energy stored in the natural inductance of the electrical system. Extinguishing path 220 may include, for example, and without limitation, a surge arrestor, such as, for example, one or more variable impedances, such as a metal-oxide varistor (MOV) that can be sized to reduce the di/dt experienced during interruption and, consequently, limit the peak TIV. When gas discharge tube 100 is opened, e.g., on the order of 1 microsecond, the load current is diverted through extinguishing path 220 where it is dissipated into the solid state material, e.g., a metal-oxide, over some period of time. The time period between the peak fault current and the reduction of total current through DC circuit breaker 200 to zero is referred to as the fault current suppression time. The fault current suppression time in which the extinguishing path 220 reduces the current through DC circuit breaker 200 from its maximum value to zero is a function of the operating voltage, the energy stored in the electrical system, and the impedance of extinguishing path 220 itself. For example, extinguishing path 220 may include a MOV to lengthen the fault current suppression time to the range of 1 microsecond to 1 second. In another example embodiment, an MOV may be selected to lengthen the fault current suppression time to the range of 10 microseconds to 10 milliseconds. For example, in certain embodiments the fault current suppression time is lengthened to about 500 microseconds. By lengthening the fault current suppression time, the effective di/dt is reduced, resulting in reductions in TIV and peak TIV. Generally, an appropriate balance between interruption speed, or break time, and TIV depends on the specific electrical system in which DC circuit breaker 200 is implemented, e.g., the nature of DC source 202 and load 204. Notably, DC circuit breaker 200 does not include a parallel commutation path for DC current supplied to load 204, i.e., current is conducted only through the normal current path, i.e., gas discharge tube 100, during normal operation, and DC current is not diverted through a parallel commutation path before interruption for the purpose of opening gas discharge tube 100.

Generally, gas discharge tubes, such as gas discharge tube 100, enable very high voltages, e.g., greater than 100 kV, with little increase in cost. Accordingly, gas discharge tube 100 enables very fast interruption in DC circuit breaker 200, and can withstand very high TIV without much additional cost. Conversely, conventional power semiconductors generally operate with 10 kV or less standoff and cannot withstand high TIV. Certain power semiconductors may be able to withstand up to 20 kV, but still must be stacked to enable voltages greater than 40 kV or 100 kV.

Figure 3:
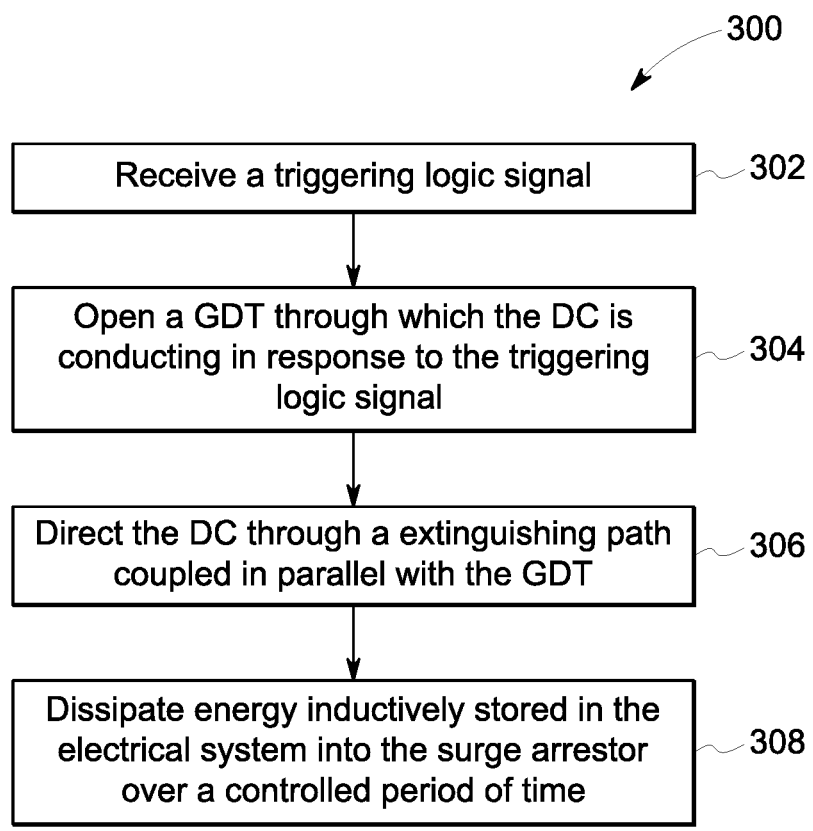
FIG. 3 is a flow diagram of an exemplary method of interrupting a DC using the DC circuit breaker shown in FIG. 2.

FIG. 3 is a flow diagram of a method 300 of interrupting a direct current (DC) in an electrical system using a DC circuit breaker, such as DC circuit breaker 200 (shown in FIG. 2). DC circuit breaker 200 is coupled in a circuit or electrical system between DC source 202 and load 204. DC circuit breaker 200 conducts a current, or load current, through gas discharge tube 100, which includes a thermionic cathode, i.e., cathode 106, having a low forward voltage to reduce parasitic losses during normal operation. Control grid 108 of gas discharge tube 100 is energized to establish a conductive plasma between cathode 106 and anode 104 to close the circuit, or close gas discharge tube 100. Once the conductive plasma is established and sustained, control grid 108 is de-energized, and current conducts through DC circuit breaker 200.

Method 300 includes receiving 302 a triggering logic signal from controller 206 of DC circuit breaker 200. Controller 206, in certain embodiments, generates the triggering logic signal based on, for example, a current signal received from sensor 210, which measures the current conducted through breaker assembly 208. Controller 206, in such embodiments, generates the triggering logic signal when the current rises above the protection threshold. In response to the triggering logic signal, gas discharge tube 100 is opened 304 to interrupt the current through DC circuit breaker 200. Gas discharge tube 100 is opened by energizing control grid 108 in a manner that disrupts the conductive plasma that makes the circuit from cathode 106 to anode 104. This opening occurs on the order of 1 microsecond in the exemplary embodiment.

Once gas discharge tube 100 is opened, current is directed 306 through extinguishing path 220, which is coupled in parallel with gas discharge tube 100. Consequently, the current through DC circuit breaker 200 does not reduce to zero until the current through extinguishing path 220 reduces to zero. Generally, the faster the current falls, the greater the resulting TIV, because of the energy stored in the natural inductance of the electrical system in which method 300 is embodied. Extinguishing path 220 dissipates 308 the energy inductively stored in the electrical system, for example, into a metal-oxide body of extinguishing path 220. Extinguishing path 220 dissipates 308 the energy over a controlled period of time to reduce the effective di/dt of the interruption. Extinguishing path 220 lengthens the time to open DC circuit breaker 200 by providing a variable impedance that, in combination with the operating voltage of the circuit in which DC circuit breaker 200 is implemented, dictates the speed with which current is reduced to zero. For example, in certain embodiments, extinguishing path 220 may reduce the current through DC circuit breaker to zero in a range of 1 microsecond to 1 second from receipt 302 of the triggering logic signal. In certain embodiments, extinguishing path 220 reduces the current through DC circuit breaker to zero in a range of 10 microseconds to 10 milliseconds from receipt 302 of the triggering logic signal.

The above described embodiments of the present disclosure relate to DC circuit breakers. Such DC circuit breakers may be implemented in electrical systems operating, for example, at medium- or high-voltage, or above about 1 kilovolt. The DC circuit breakers described herein provide current interruption via an in-line gas discharge tube including a thermionic cathode having a low forward voltage. Accordingly, during normal operation, the gas discharge tube conducts with low losses, or low parasitic losses. The DC circuit breakers described herein provide current interruption without a parallel conduction path through which current is diverted for the purpose of opening, or interrupting, the DC current. The DC circuit breakers described herein include a parallel extinguishing path (e.g., a surge arrestor) including, for example, and without limitation, a variable impedance to dissipate energy stored in the natural inductance of the electrical system. The surge arrestor, in certain embodiments, is sized to lengthen the break time, or the time necessary to reduce current through the DC circuit breaker to zero. For example, the surge arrestor may include a metal-oxide varistor that lengthens the fault current suppression time, and therefore the break time, effectively reducing the di/dt, the TIV, and the peak TIV for the interruption.

An exemplary technical effect of the methods, systems, and apparatus described herein includes at least one of: (a) providing a gas discharge tube including a thermionic cathode having a low forward voltage; (b) reducing parasitic losses during normal operation of a DC circuit breaker due to the reduced forward voltage of the gas discharge tube; (c) controlling a time to zero current through a DC circuit breaker by adjusting an impedance of a parallel surge arrestor; (d) eliminating a parallel conduction path for the purpose of diverting DC for the purpose of opening the primary conduction path of a DC breaker; and (e) reducing cost for very fast interruption capability and high TIV tolerance through the use of a gas discharge tube instead of conventional power semiconductors.

Exemplary embodiments of methods, systems, and apparatus for DC circuit breakers are not limited to the specific embodiments described herein, but rather, components of systems and/or steps of the methods may be utilized independently and separately from other components and/or steps described herein. For example, the methods may also be used in combination with other non-conventional circuit breakers, and are not limited to practice with only the systems and methods as described herein. Rather, the exemplary embodiment can be implemented and utilized in connection with many other applications, equipment, and systems that may benefit from reduced cost, reduced complexity, commercial availability, improved manufacturability, and reduced product time-to-market.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct current (DC) circuit breaker, comprising:
a gas discharge tube (GDT) for conducting and interrupting a load current through a normal current path, said GDT comprising:
a thermionic cathode comprising a thermionic emitter material with a low work-function;
an anode; and
a control grid configured to regulate opening and closing of the normal current path; and
an extinguishing path coupled in parallel with said GDT and configured to lengthen a break time for said DC circuit breaker.

2. The DC circuit breaker of claim 1, wherein said thermionic cathode comprises lanthanum hexaboride (LaB6) or barium (Ba).

3. The DC circuit breaker of claim 1, wherein said extinguishing path comprises a surge arrestor configured to control a fault current suppression time.

4. The DC circuit breaker of claim 3, wherein said surge arrestor comprises a metal-oxide varistor (MOV).

5. The DC circuit breaker of claim 1 further comprising a sensor coupled to a line side of said GDT and configured to:
detect a fault condition; and
transmit a current signal indicative of the fault condition.

6. The DC circuit breaker of claim 5 further comprising a controller coupled to said sensor and said GDT, said controller configured to:
receive the current signal; and
regulate energizing of said control grid to open a conduction path of said GDT in response to the current signal.

7. The DC circuit breaker of claim 1, wherein said GDT has a standoff voltage of at least 1000 volts.

8. A method of interrupting a direct current (DC) in an electrical system using a DC circuit breaker, said method comprising:
receiving a triggering logic signal;
opening, in response to the triggering logic signal, a gas discharge tube (GDT) through which the DC is conducting, wherein the GDT comprises a thermionic cathode with a thermionic emitter material with a low work-function;
directing the DC through an extinguishing path coupled in parallel with the GDT; and
dissipating energy inductively stored in the electrical system into the extinguishing path over a controlled period of time.

9. The method of claim 8 further comprising:
energizing a control grid of the GDT to establish a conductive plasma between a thermionic cathode and an anode of the GDT to close the GDT; and
de-energizing the control grid once the conductive plasma is sustained.

10. The method of claim 8, wherein the thermionic cathode includes lanthanum hexaboride (LaB6) or barium (Ba).

11. The method of claim 9, wherein opening the GDT comprises energizing the control grid of the GDT to disrupt the conductive plasma between the thermionic cathode and the anode.

12. The method of claim 8 further comprising:
sensing the DC conducted through the GDT;
transmitting a current signal representing the DC conducted through the GDT;
receiving the current signal at a controller; and
generating the triggering logic signal in response to the current signal.

13. The method of claim 8, wherein directing the DC through the extinguishing path comprises directing the DC through a surge arrestor configured to control a break time for the DC circuit breaker.

14. The method of claim 13, wherein directing the DC through the surge arrestor comprises directing the DC through a metal-oxide varistor (MOV).

15. The method of claim 13, wherein dissipating energy comprises dissipating energy inductively stored in the electrical system into the surge arrestor over a fault current suppression time ranging from 1 microsecond to 1 second.

16. The method of claim 13, wherein dissipating energy comprises dissipating energy inductively stored in the electrical system into the surge arrestor over a fault current suppression time ranging from 10 microseconds to 10 milliseconds.

17. A gas discharge tube (GDT) comprising:
a housing defining an interior portion;
a thermionic cathode comprising lanthanum hexaboride (LaB6) and disposed within the interior portion, said thermionic cathode having a low forward voltage;
an anode disposed within the interior portion and spaced apart from said thermionic cathode;
a gas disposed in the interior portion and configured to insulate said thermionic cathode from said anode; and
a control grid disposed between said thermionic cathode and said anode within the interior portion, said control grid configured to generate an electric field to establish a conductive plasma between said thermionic cathode and said anode to close a normal current path extending between the thermionic cathode and the anode.

18. The GDT of claim 17, wherein said control grid is further configured to generate an electric field to disrupt the conductive plasma and open the circuit extending between said thermionic cathode and said anode.

19. The GDT of claim 18, wherein said control grid is further configured to open the circuit extending between said thermionic cathode and said anode within 5 microseconds of receipt of a logic signal so instructing.

20. The GDT of claim 17, wherein said gas is deuterium.

21. The GDT of claim 17 further comprising a gas reservoir configured to regulate a gas pressure within the interior portion over a life of said GDT.

* * * * *

UNITED STATES PATENT AND TRADEMARK OFFICE
CERTIFICATE OF CORRECTION

| | | |
|---|---|---|
| PATENT NO. | : 11,251,598 B2 | |
| APPLICATION NO. | : 16/740058 | |
| DATED | : February 15, 2022 | |
| INVENTOR(S) | : Timothy John Sommerer et al. | |

It is certified that error appears in the above-identified patent and that said Letters Patent is hereby corrected as shown below:

In the Specification

Column 1, Line 4, please add:
This invention was made with Government support under DE-AR0001107 awarded by DOE, Office of ARPA-E. The Government has certain rights in this invention.

Signed and Sealed this
Twenty-ninth Day of August, 2023

Katherine Kelly Vidal
*Director of the United States Patent and Trademark Office*